United States Patent [19]

Taniura

[11] Patent Number: 4,960,320
[45] Date of Patent: Oct. 2, 1990

[54] OPTICAL BEAM SPLITTING METHOD AND AN OPTICAL BEAM SPLITTING/MODULATION METHOD

[75] Inventor: Hiroshi Taniura, Ibaragi, Japan
[73] Assignee: Think Laboratory Co., Ltd., Chiba, Japan
[21] Appl. No.: 286,632
[22] Filed: Dec. 16, 1988

[30] Foreign Application Priority Data

May 16, 1988 [JP] Japan ................. 63-118659

[51] Int. Cl.$^5$ .................... G02B 27/14; G02F 1/33
[52] U.S. Cl. ..................................... 350/171; 350/358
[58] Field of Search ................. 350/171, 358

[56] References Cited

U.S. PATENT DOCUMENTS

| | | | |
|---|---|---|---|
| 4,362,361 | 12/1982 | Campbell et al. | 350/171 |
| 4,592,621 | 6/1986 | Amano et al. | 350/171 |
| 4,624,534 | 11/1986 | Amano | 350/358 |
| 4,701,012 | 10/1987 | Kaiser | 350/171 |
| 4,867,542 | 9/1989 | Smimazu et al. | 350/358 |

FOREIGN PATENT DOCUMENTS

| | | |
|---|---|---|
| 52-122135 | 10/1977 | Japan. |
| 58-10713 | 1/1983 | Japan. |
| 60-19101 | 1/1985 | Japan. |
| 1220972 | 1/1971 | United Kingdom ........... 350/171 |

Primary Examiner—Bruce Y. Arnold
Assistant Examiner—Terry S. Callaghan
Attorney, Agent, or Firm—Koda & Androlia

[57] ABSTRACT

An optical beam splitting method and optical beam splitting/modulating method for recording halftone plate images on a recording material through controlling a light exposing device by image signals obtained by photoelectric manipulation of an original image. Two light beam splitters are used so that a single light beam can be split into a plurality of split light beams which are lined up in two rows and shifted by one-half pitch with respect to each other and then modulated in multi-channel ultrasonic modulators, one row of the light beams being modulated with a delay without causing crosstalk. The number of split beams to be modulated is approximately doubled compared to a conventional system, and the size of the dots on the recording material can be decreased so that the image resolution is remarkably improved.

2 Claims, 3 Drawing Sheets

OPTICAL BEAM SPLITTING METHOD AND AN OPTICAL BEAM SPLITTING/MODULATION METHOD

BACKGROUND OF THE INVENTION

1. Field of the Invention

The present invention relates to an optical beam splitting method and an optical beam splitting/modulation method which are necessary in cases where, for example, halftone plate duplicate images are recorded on a recording material by controlling a light-exposure means on its recording side in accordance with image signals obtained by photoelectric manipulation of an original image, and especially in cases where halftone plate images are recorded by independently modulating a multiple number of beams on the basis of image signals.

2. Prior Art

Recording of halftone plate images by the relative scanning of a multiple number of light beams (lined up in a row) across the surface of a recording material, with the light beams independently modulated on the basis of image signals, is conventionally known in the art. In most cases, the multiple number of light beams are obtained by installing a multiple number of totally reflective mirrors and semi-reflective mirrors, and splitting a single light beam generated by an argon laser by reflecting the light beam from the mirrors. The respective light beams thus obtained are independently modulated by means of a multi-channel ultrasonic modulator and are then reduced in diameter by means of a crystal optical system and directed onto the surface of the recording material.

If, in a case were some crosstalk is permissible in modulation in an ultrasonic modulator, the beam diameter of the Gauss beams is, for example, 1.2 mm, then the spacing of the acoustic electrodes and the spacing of the beams is set at 1.1 mm, the acoustic electrodes have a diameter of 1.2 mm and are installed in two zig-zag rows on the side surface of the modulator. Furthermore, immediately after passing through the ultrasonic modulator, the beams are reduced in diameter by means of a crystal optical system and are directed onto the surface of a recording material.

However, in order to prevent the modulation of one light beam from causing crosstalk with adjacent light beams on both sides, it is necessary to separate the beam diameters of the Gauss beams passing through the ultrasonic modulator (i.e., the beam diameters which represent an intensity distribution effective in exposing the recording material) so that there is no overlapping. For example, if the beam diameter of the Gauss beams is 1.2 mm, the acoustic electrodes are constructed with a diameter of 1.5 mm, and the spacing of the acoustic electrodes and the spacing of the beams is set at 2.0 mm. In the case of a multiple number of optical beams which are lined up in a row with widened spacing in this manner, the spacing is narrowed using optical fibers, etc., so that adjacent light beams overlap slightly with each other, and the beams are reduced in diameter by means of a crystal optical system before being directed onto the surface of a recording material.

In such a case, the light beams which are independently modulated on a beam by beam basis by the ultrasonic modulator cannot be immediately reduced in diameter by the crystal optical system and caused to expose the recording material. It is necessary first to narrow the beam spacing using optical fibers or mirrors, etc., so that the circles and the Gauss diameters of the adjacent light beams overlap slightly, forming a connected chain. Afterward, the beam diameters are reduced by a crystal optical system, and the beams are directed onto the surface of the aforementioned recording material. The reason for this is that if a multiple number of light beams lined up in a row are separated from each other instead of being overlapped in the form of a connected chain, the row of dots formed on the surface of the recording material will be a row of unconnected dots. In such a case, halftone images of various sizes cannot be formed on the surface of the recording material even if the multiple number of light beams are independently modulated on the basis of image signals.

Conversely, if the overlapping between adjacent light beams is excessive, then, as was described above, crosstalk is generated in the independent modulation of the respective light beams by the multi-channel ultrasonic modulator. Specifically, the acoustic electrodes will not only drive their corresponding light beams, but will also drive the light beams located on both sides of their corresponding light beams.

However, in cases where an optical beam splitter of the type described in Japanese Patent Application Laid-Open (Kokai) No. 52-122135 is used, the generation of a certain amount of crosstalk in the modulation occurring in the ultrasonic modulator must be tolerated. If it is desired to allow no crosstalk, it is necessary to install optical fibers, etc., after the ultrasonic modulator, and to use these to cause slight overlapping of the light beams with narrowed spacing, after which the beams are reduced in diameter by a crystal optical system and directed onto the surface of a recording material. As a result, a larger amount of space is required.

On the other hand, in cases where an optical beam splitter of the type described in Japanese Patent Application Laid-Open (Kokai) No. 58-10713 is used, a multiple number of light beams lined up in a row, which have been split into spaced light beams by the beam splitter, can be immediately reduced in diameter by means of a crystal optical system and caused to expose a recording material after being independently modulated on a beam by beam basis by a multi-channel ultrasonic modulator. Accordingly, this system is superior to that described in Japanese Patent Application Laid-Open (Kokai) No. 52-122135. The reason for this is that the beam spacing is gradually narrowed as the multiple number of light beams leave the optical beam splitter as described above. However, some problems remain when the light beams are independently modulated on a beam by beam basis by means of a multi-channel ultrasonic modulator. Specifically, since the light beams are not parallel to each other, the modulating efficiency of the modulator drops. Furthermore, light leakage may occur in some cases, and formation of the acoustic electrodes of the modulator is also difficult. In addition, maintaining the thickness and angle of intersection of the two surfaces of the optical beam splitter at prescribed values with an ultra-high degree of precision is difficult, and the manufacture of the optical beam splitter is very difficult. If the thickness or angle of intersection of the two surfaces of the optical beam splitter shows even a slight variation, the focal distances of the respective light beams will show a large variation, and the spacing between the optical beam splitter and the modulator, as well as the spacing between the modulator and the crystal optical system modulator will be unavoidably different in each individual apparatus.

Furthermore, in both the optical beam splitters described in Japanese Patent Application Laid-Open (Kokai) Nos. 52-122135 and 58-10713, the practical limit of the number of light beams into which one light beam can be split is around 20. Accordingly, it is impossible to improve the image resolution by increasing the number of split beams beyond this number. If the number of split light beams is increased beyond about 20, heat accumulates in the interior of the modulator crystal so that there are problems in terms of insufficient heat resistance and durability. Furthermore, in the case of the optical beam splitter described in Japanese Patent Application Laid-Open (Kokai) No. 52-122135, an increase in the number of split beams makes it necessary to increase the size of the crystal optical system.

SUMMARY OF THE INVENTION

The object of the present invention is to provide an optical beam splitting method and an optical beam splitting/modulation method in which a multiple number of light beams which are incident parallel to each other in rows can each be split into two light beams, in which the respective light beams can be independently modulated without the occurrence of any crosstalk in multichannel ultrasonic modulators, in which there is no need to make the multi-channel ultrasonic modulators and crystal optical system installed in positions following the optical beam splitter any larger than in conventional systems of this type, in which there is no need to install mirrors or optical fibers between the multi-channel ultrasonic modulators and the crystal optical system, and in which the apparatus is compact, simple and easy to assemble and adjust.

The optical beam splitting method of the first embodiment of the invention is characterized in that a light beam is caused to pass through a first optical beam splitter in which (a) a predetermined number of transparent parallel plates whose thicknesses are uniform to a high degree of precision are stacked together, (b) the back surface of the transparent parallel plate which is the farthest from the side at which the light beam enters is coated with a totally reflective film, while the back surfaces of all of the remaining transparent parallel plates are coated with different semi-reflective films whose respective reflectivities gradually increase from the front of the stack toward the back of the transparent parallel plates, and (c) the coating regions of the totally reflective film and semi-reflective films are positioned in an oblique arrangement which is struck by the light beam traveling obliquely through the interiors of the transparent parallel plates.

The light beam is therefore partially reflected by each of the semi-reflective films and completely reflected by the totally reflective film, so that the light beam is converted into a number of split light beams which are of equal luminous intensity (the number of the split light beams is equal to the number of the transparent parallel plates), and so that the respective split light beams are emitted parallel to each other in a row in the direction of the side of the stack from which the light beam initially entered, without any of the split light beams striking the preceding semi-reflective films. The split light beams are then caused to be incident on an optical beam splitter in which (a) one surface of a light-transmitting material is partially coated in band form with a totally reflective film, while another parallel surface of said light-transmitting material is partially coated in band form with a reflective film which has a reflectivity of 50%, and the surface which is coated with the totally reflective film is inclined two-dimensionally by a prescribed amount with respect to the optical axes of the split light beams split by the first optical beam splitter.

As a result, a series of split light beams with approximately 50% of the intensity of the incident light beams are split and emitted parallel to each other in a row from the semi-reflective film, and a series of split light beams with the remaining 50% of the intensity of the incident light beams are internally reflected by the semi-reflective film and completely reflected by the totally reflective film, and are therefore again emitted parallel to each other in a row from the surface coated with the aforementioned semi-reflective film but are emitted so that they miss the semi-reflective film, and are furthermore emitted so that the split light beams are separated by a prescribed distance from the series of split light beams, and so that the individual split light beams in the series are shifted by approximately one-half pitch with respect to the individual split light beams in the series.

The optical beam splitting/modulation method of the second embodiment of the present invention is characterized in that a light beam is caused to pass through a first optical beam splitter in which (a) a prescribed number n of transparent parallel plates whose thicknesses are uniform to a high degree of precision are stacked together, (b) the back surface of the transparent parallel plate which is the farthest from the side at which the aforementioned light beam enters is coated with a totally reflective film, wnile the back surfaces of all of the remaining transparent parallel plates are coated with different semi-reflective films whose respective reflectivities gradually increase from the front of the stack toward the back in a numerical series in relation to the number of transparent parallel plates, and (c) the coating regions of the totally reflective film and semi-reflective films are positioned in an oblique arrangement which is struck by the light beam traveling obliquely through the interiors of the transparent parallel plates.

The light beam is therefore partially reflected by each of the semi-reflective films and completely reflected by the totally reflective film, so that the light beam is converted into a number of split light beams which are of equal luminous intensity (the number of the split light beams is equal to the number of the transparent parallel plates), and so that the respective split light beams are emitted parallel to each other in a row in the direction of the side of the stack from which the light beam initially entered, without any of the split light beams striking the preceding semi-reflective films.

The split light beams are next caused to be incident on an optical beam splitter in which (a) one surface of a light-transmitting material is partially coated in band form with a totally reflective film, while another parallel surface of the light-transmitting material is partially coated in band form with a reflective film which has a reflectivity of 50%, and (b) the surface which is coated with the totally reflective film is inclined two-dimensionally by a prescribed amount with respect to the optical axes of the split light beams split by the first optical beam splitter.

As a result, a series of split light beams with approximately 50% of the intensity of the incident light beams are split and emitted parallel to each other in a row from the semi-reflective film, and a series of split light beams with the remaining 50% of the intensity of the incident light beams are internally reflected by the semi-reflective film and completely reflected by the totally reflective film, and are therefore again emitted parallel to each other in a row from the surface coated with the semi-reflective film, but are emitted so that they miss the semi-reflective film, and are furthermore emitted so that the split light beams are separated by a predetermined distance from the series of split light beams and so that the individual split light beams in the series are shifted by approximately one-half pitch with respect to the individual split light beams in the series Furthermore, two multi-channel ultrasonic modulators equipped with acoustic electrodes which are positioned perpendicular to the respective light beams and independently modulate the light beams (the acoustic electrodes are installed corresponding to the number and pitch of the light beams) are installed adjacent to each other with the acoustic electrodes on the outside, and the series of light beams with 50% intensity emitted from the semi-reflective film with a reflectivity of 50% are passed through one of the ultrasonic modulators.

Also, the series of light beams with 50% intensity emitted from the uncoated area are passed through the other multi-channel ultrasonic modulator, these light beams being individually and indepedently modulated on the basis of image signals, and the light beams in one series modulated with a delay applied.

DETAILED DESCRIPTION OF THE INVENTION

Figure 1:
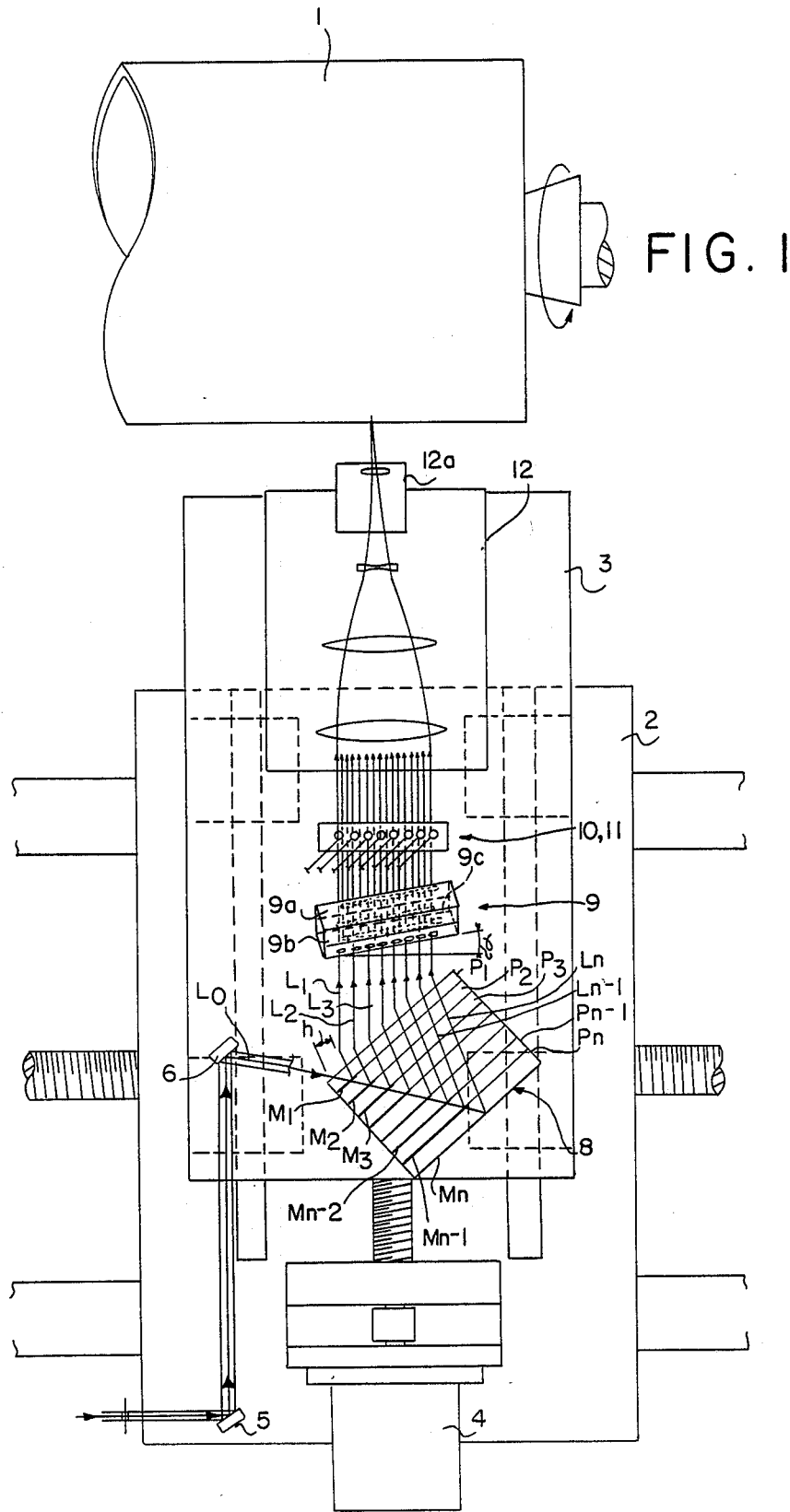
FIG. 1 is a plain view of a direct exposure apparatus for a gravure palte making roll.

The basic structure of the present invention is common to both the first and second embodiments thereof. A direct exposure apparatus is described in which (a) an argon laser beam is split into a row of eight light beams, which are then further split to produce two rows containing a total of sixteen light beams, (b) these light beams are independently modulated on the basis of halftone image signals, (c) signals are sent with a delay corresponding to a phase shift applied to one row of light beams, (d) the light beams are reduced in diameter by a crystal optical system, (e) a rotating gravure platemaking roll coated with a photosensitive film is exposed using these light beams, and (f) a scanning movement is performed in the direction of the length of the surface of the platemaking roll.

In the Figures, reference numeral 1 indicates a platemaking roll. This roll 1 is chucked at both ends by a pair of rotating chucks, and is caused to revolve at a high speed. Reference numeral 2 denotes an X table, which is free to move along the length of the platemaking roll 1 in accordance with the rotation of the platemaking roll 1. A Y table 3 is intalled on the X table and can be moved toward or away from the platemaking roll 1 by a control motor 4.

In this apparatus, a light beam (laser beam) from a fixed argon laser (not shown in the Figures) is bent by a totally reflective mirror 5 installed on the X table 2 and totally reflective mirror 6 installed on the Y table 3 and is thus conducted into a first optical beam splitter 8 which is installed on the Y table 3. This light beam is split into eight light beams which are lined up parallel to each other in a horizontal plane by the first optical beam splitter 8. These light beams are then split into sixteen light beams in two rows (eight light beams per row), which are shifted by one-half pitch with respect to each other by a second optical beam splitter 9 which is installed on the Y table 3.

Next, these light beams are independently modulated and controlled on the basis of halftone image signals by two eight-channel ultrasonic modulators 10 and 11 which are stacked one on top of the other. The light beams are then reduced to a small beam diameter by a crystal optical system 12 and are focused on the platemaking roll 1 coated with a photosensitive film by an auto-focus lens 12a, so that the photosensitive film is scanned and exposed in accordance with the movement of the X table 2.

The optical beam splitting method of this invention specifies that (a) a single light beam is split into a multiple number of light beams in a row using the first optical beam splitter 8, (b) each of the split beams is then further split into two light beams using the second optical beam splitter 9, and (c) the light beams are split into two rows which are shifted by one-half pitch with respect to each other.

The optical beam splitting/modulation method of this invention specifies that, in addition to the abovementioned optical beam splitting method, (a) the two rows of split beams are separately conducted into the multi-channel ultrasonic modulators 10 and 11, (b) the respective light beams are independently modulated and controlled, (c) one row of the light beams is modulated with a delay, and then (d) the light beams are modulated so that they form a single row in the form of a connected chain on the object of recording.

Figure 2:
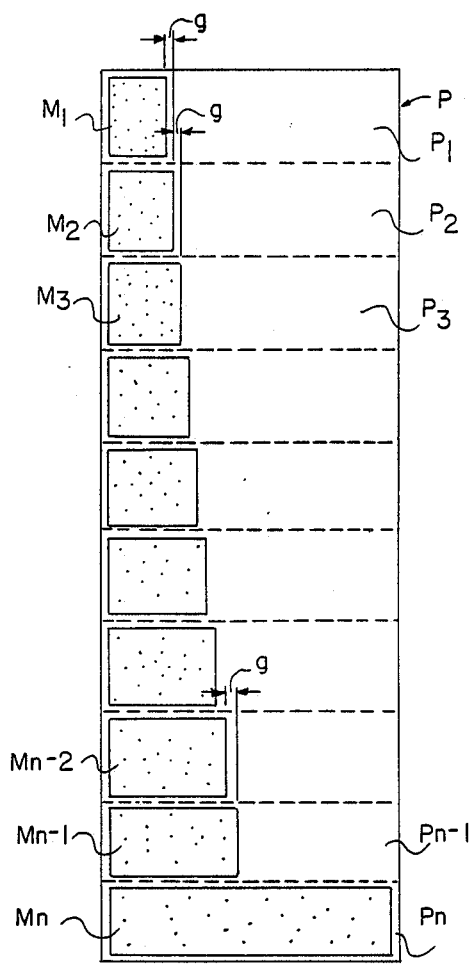
FIG. 2 is a bottom view of a multi-coating plate which is used to manufacture the optical beam splitter which performs the first stage of beam splitting.

In the first optical beam splitter 8, as seen in FIG. 2, a prescribed number n of transparent parallel plates $P1$, $P2$, $P3$, ... $Pn-1$, $Pn$ whose thicknesses are uniform to a high degree of precision are stacked together. The back surface of the transparent parallel plate $Pn$ which is the farthest from the side to which the light beam enters is coated with a totally reflective film $Mn$, while the back surfaces of all of the remaining transparent parallel plates $P1$, $P2$, $P3$, ... $Pn-1$ are coated with different semi-reflective films $M1$, $M2$, $M3$, ... $Mn-2$ $Mn-1$. The respective reflectivities of these films gradually increase from the front ($M1$) of the stack toward the back ($Mn-1$) in a numerical series $1/n$, $1/(n-1)$, $1/(n-2)$, $1/(n-3)$, ... $1/4$, $1/3$, $1/2$ in relation to the number n of the transparent parallel plates. The coating regions of the totally reflective film $Mn$ and semi-reflective films $M1$, $M2$, $M3$, ... $Mn-1$ are positioned in an oblique arrangement which is struck by the light beam LO traveling obliquely through the interiors of the transparent parallel plates $P1$ through $Pn$.

Furthermore, the first optical beam splitter 8 is designed so that the light beam LO is converted into a number n of split light beams $L1$, $L2$, $L3$, .... $Ln-1$, $Ln$ which are of equal luminous intensity (the number n of the split light beams is equal to the number n of the transparent parallel plates) by partial reflection by the respective semi-reflective films M1, M2, M3, ... Mn−1 and total reflection by the totally reflective film Mn, and so that the respective split light beams are emitted parallel to each other in a row in the direction of the side of the stack from which the light beam LO initially entered, without any of said split light beams striking the preceiding semi-reflective films.

The first optical beam splitter 8 has n transparent parallel plates P1, P2, P3, ... Pn−1, Pn. As shown in FIG. 2, these plates are formed by splitting a single transparent parallel substrate P into N number of plates, which are then stacked together. Accordingly, the thicknesses of the plates are uniform to a high degree of precision. Furthermore, before the substrate is split into n plates, it is coated with the semi-reflective films M1, M2, M3, ... Mn−2, Mn−1 and the totally reflective film Mn. In the example illustrated in the Figures, the number of semi-reflective films M1 through Mn−1 is nine. The semi-reflective film M1 has a reflectivity of 1/8 (i.e., a transmissivity of 7/8), the semi-reflective film M2 has a reflectivity of 1/7 (i.e., a transmissity of 6/7), the semi-reflective film M3 has a relfectivity of 1/6 (i.e., a transmissivity of 5/6), and so on, so that the semi-reflective film Mn−2 has a reflectivity of 1/3 (i.e., a transmissivity of 2/3), and the semi-reflective film Mn−1 has a reflectivity of 1/2 (i.e., a transmissivity of 1/2). Accordingly, each of the n split light beams L1, L2, L3. Ln−1, Ln shown in FIG. 1 has a quantity of light equal to 1 of n (1/n) equal parts of the light beam LO.

In this embodiment, the semi-reflective films M1 through Mn−1 are rectangular in shape, and are formed stepwise so that the films gradually increase in size by a small amount g. However, the semi-reflective films M1 through Mn−1 could also be formed as circular films having the same diameter, and which are at least larger than the beam diameter of the light beam LO. This small distance g is ½ of the small distance h shown in FIG. 1.

Figure 3:
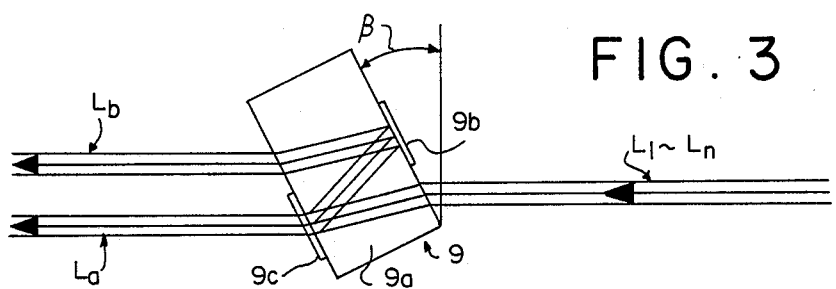
FIG. 3 is a view seen from the direction of arrow III in FIG. 1.
Figure 4:
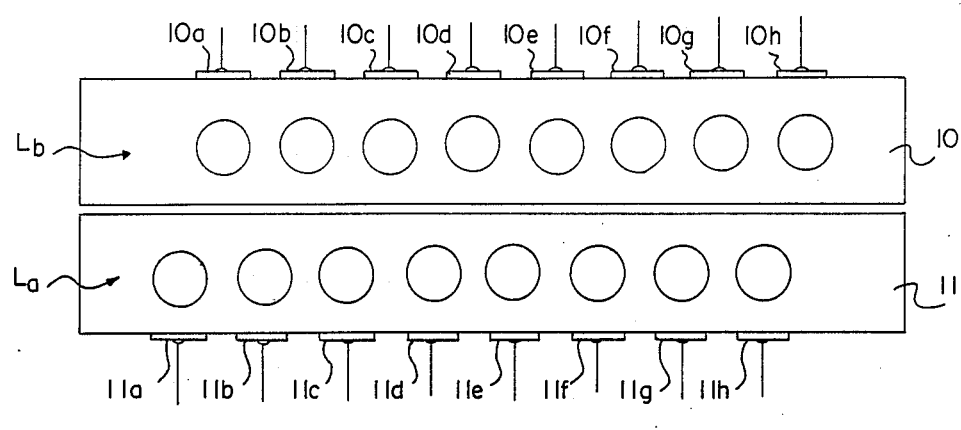
FIG. 4 is a view seen from the direction of arrows IV—IV in FIG. 1.

As shown in FIG. 3, the second optical beam splitter 9 is installed so that it is inclined by a relatively large angle $\beta$ (e.g., 45°) with respect to the plane perpendicular to the eight incident light beams. Furthermore, one surface of the light-transmitting material 9a of the optical beam splitter 9 is partially coated in a band form with a totally reflective film 9b, and the optical beam splitter 9 is arranged so that the eight light beams split by the optical beam splitter 8 respectively enter the optical beam splitter 9 at points below the totally reflective film 9b.

Furthermore, another surface of the light-transmitting material 9a is partially coated in a band form in an area parallel to the surface coated with the totally reflective film 9b with a semi-reflective film 9c which has a reflectivity of 50%. This semi-reflective film 9c with a reflectivity of 50% transmits half of the quantity of the light of each of the eight light beams which enter the light-transmitting material 9a at points below the totally reflective film 9b and travel through the interior of the material 9a. Furthermore, the film 9c reflects the remaining half of the quantity of the light of each of the light beams toward the totally reflective film 9b. The light beams which travel toward the totally reflective film 9b through the interior of the light-transmitting material 9a are reflected by said totally reflective film 9b and pass through the points above the semi-reflective film 9c with a reflectivity of 50% on the opposite surface.

Thus, in the optical beam splitter 9, eight light beams are caused to enter the beam splitter at points below the totally reflective film 9b, and each of these light beams is split into two light beams, each of which having 50% of the quantity of light of the original light beam. Eight of these split light beams are emitted from the semi-reflective film 9c with a reflectivity of 50%, and the remaining eight split light beams are emitted at point above the semi-reflective film 9c with a reflectivity of 50%.

As is shown in FIG. 1, the optical beam splitter 9 is installed so that it is inclined at a small angle $\alpha$ with respect to the direction in which the eight incident light beams are lined up in a row. As a result, because of internal reflection, the positions at which the eight light beams in the upper row i.e., the light beams which are emitted at points above the aforementioned semi-reflective film 9c are emitted from the optical beam splitter 9 are shifted more greatly in a lateral direction than the positions at which the eight light beams in the lower row i.e., the light beams which are emitted from the semi-reflective film 9c are emitted from the optical beam splitter 9. Furthermore, the angle $\gamma$ is finely adjusted so that the positions at which the eight light beams in the upper row are emitted from the optical beam splitter 9 are laterally shifted by one-half pitch with respect to the positions at which the eight light beams in the lower row are emitter from the optical beam splitter 9.

The sixteen light beams with equal quantities of light produced by the optical beam splitter 9 enter two eight-channel ultrasonic modulators 10 and 11 which are provided one on top of the other, with a spacing of e.g. 1.0 mm between the modulators. The eight light beams in the upper row emitted from the optical beam splitter 9 enter the upper modulator 10, while the eight light beams in the lower row emitted from the optical beam splitter 9 enter the lower modulator 11. Acoustic electrodes 10a through 10h which generate ultrasonic waves for the purpose of independent modulation of the respective light beams are instaled on the upper surface of the upper modulator 10. Furthermore, acoustic electrodes 11a through 11h which generate ultrasonic waves for the purpose of independent modulation of the respective light beams are installed on the lower surface of the lower modulator 11. These acoustic electrodes 10a through 10h and 11a through 11h are installed on side surfaces which run perpendicular to the light beams passing through the modulators, so that the electrodes are positioned perpendicular to the respective light beams. These electrodes independently modulate the respective light beams on the basis of image signals. The relative relationship of the beam diameter of the light beams, the size of the acoustic electrodes and the spacing of the electrodes is, for example, as follows: Beam diameter=0.8 mm, size of acoustic electrodes=1.0 mm, and electrode spacing=1.5 mm.

Figure 5:
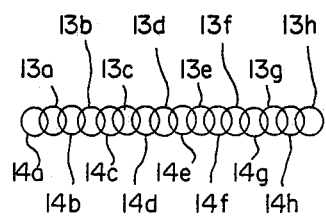
FIG. 5 is a diagram which illustrates an arrangement of the light beam dots on the recording surface, indicating how sixteen light beams in two rows are directed so that the surface of the recording material is exposed in a single row of dots.

The eight light beams which pass through the upper modulator 10 and the eight light beams which pass through the lower modulator 11 are shifted in phase with respect to the gravure platemaking roll 1 which constitutes the recording material. Accordingly, when the gravure platemaking roll 1 is caused to rotate in the direction indicated by the arrow, modulation signals which apply the required delay processing are sent to the acoustic electrodes 11a through 11h of the lower modulator 11. As is shown in FIG. 5, the gravure platemaking roll 1 is first exposed in eight spaced dots 13a through 13h lined up in a row, which are created by the eight light beams modulated and controlled by the upper modulator 10. Next, when the gravure platemaking roll 1 has rotated in a very short time by an amount corresponding to the aforementioned phase shift, the gravure platemaking roll 1 is exposed in eight spaced dots 14a through 14h lined up in a row, which are created by the eight light beams modulated and controlled by the lower modulator 11. Accordingly, these dots 14a through 14h are shifted by one-half pitch with respect to the previously exposed dots 13a through 13h, so that a row of overlapping dots is formed. If modulating signals based on image signals are sent to the acoustic electrodes 10a through 10h and 11a through 11h, and the timing of fthe modulating signals sent to the acoustic electrodes 11a through 11h is delayed in accordance with the phase shift, a halftone image can be exposed on the gravure platemaking roll 1.

As was described above, the optical beam splitting method and optical beam splitting/modulation method of the inventions of the present application have the following merits:

(1) Since two optical beam splitters are used, a single light beam can be split into a multiple number of split light beams which are lined up in two rows so that there is no overlapping beween adjacent light beams, and which are arranged so that the two rows are shifted by one-half pitch with respect to each other. Furthermore, since the split light beams are conducted into two stacked multi-channel ultrasonic modulators where the beams are modulated, and since one row is modulated with a delay, the respective split beams can be independently modulated without any crosstalk. Accordingly, image processing can be accomplished in a favorable manner.

(2) Since two multi-channel ultrasonic modulators are provided together, the multi-channel ultrasonic modulators and the associated crystal optical system can be maintained at approximately the same size as in a conventional system, while the number of split beams which can be modulated is approximately doubled compared to a conventional system. Accordingly, the size of the dots of the object of recording can be decreased, so that the image resolution is conspicuously improved. At the same time, the image output time can be cut approximately in half.

(3) Of the two rows of acoustic electrodes on the multi-channel ultrasonic modulators, a delay modulation is performed in the case of one row of electrodes, so that the two rows of light beams are converted into a single row which takes the form of a connected chain. Accordingly, there is no need to install mirrors or optical fibers between the multi-channel ultrasonic modulators and the crystal optical system. Thus, the apparatus is compact and simple, and assembly and adjustment of the apparatus are easy.

I claim:

1. An optical beam splitting method characterized in that:

a light beam is caused to pass through a first optical beam splitter in which (a) a prescribed number n of transparent parallel plates whose thicknesses are uniform to a high degree of precision are stacked together, (b) the back surface of the transparent parallel plate which is the farthest from the side at which said light beam enters is coated with a totally reflective film while the back surfaces of all of the remaining transparent parallel plates are coated with different semi-reflective films whose respective reflectivities gradually increase from the front of the stack toward the back in a numerical series $1/n, 1/(n-1), 1/(n-2), 1/(n-3), \ldots 1/4, 1/3, 1/2$ in relation to the number n of said transparent parallel plates, and (c) coating regions of said totally reflective film and semi-reflective films are positioned in an oblique arrangement which is struck by said light beam traveling obliquely through the interiors of said transparent parallel plates;

said light beam is partially reflected by each of said semi-reflective films and completely reflected by said totally reflective film, so that said light beam is converted into a number n of split light beams which are of equal luminous intensity, and so that the respective split light beams are emitted parallel to each other in a row in the direction of the side of the stack from which the said light beam initially entered, without any of said split light beams striking the preceding semi-reflective films; and said split light beams are next caused to be incident on an optical beam splitter in which (a) one surface of a light-transmitting material is partially coated in band form with a totally reflective film, while another parallel surface of said light-transmitting material is partially coated in band form with a reflective film which has a reflectivity of 50%, and (b) said surface which is cated with said totally reflective film is inclined two-dimensionally by a prescribed amount with respect to the optical axes of the split light beams split by the first optical beam splitter;

wherein a series of split light beams with approximately 50% of the intensity of the incident light beams are split and emitted parallel to each other in a row from said semi-reflective film and a series of split light beams with the remaining 50% of the intensity of the incident light beams are internally reflected by said semi-reflective film and completely reflected by said totally reflective film, and are therefore again emitted parallel to each other in a row from the surface coated with said semi-reflective film, but are emitted so that they miss said semi-reflective film, and are furthermore emitted so that said split light beams are separated by a prescribed distance from said series of split light beams, and so that the individual split light beams in the series are shifted by approximately one-half pitch with respect to the individual split light beams in the series.

2. An optical beam splitting/modulation method characterized in that:

a light beam is caused to pass through a first optical beam splitter in which (a) a prescribed number n of transparent parallel plates whose thicknesses are uniform to a high degree of precision are stacked together, (b) the back surface of the transparent parallel plate which is the farthest from the side at which said light beam enters is coated with a totally reflective film, while the back surfaces of all of the remaining transparent parallel plates are coated with different semi-reflective films whose respective reflectivities gradually increase from the front of the stack toward the back in a numerical series $1/n, 1/(n-1), 1/(n-2), 1/(n-3), \ldots 1/4, 1/3, 1/2$ in relation to the number n of said transparent parallel plates, and (c) the coating regions of said totally reflective film and semi-reflective films are positioned in an oblique arrangement which is struck by said light beam traveling obliquely through the interiors of said transparent parallel plates;

said light beam is partially reflected by each of said semi-reflective films and completely reflected by said totally reflective film, so that said light beam is converted into a number n of split light beams which are of equal luminous intensity, and so that the respective split light beams are emitted parallel to each other in a row in the direction of the side of the stack from which said light beam initially entered, without any of said split light beams striking the preceding semi-reflective films;

said light beams are next caused to be incident on a second optical beam splitter in which (a) one surface of a light-transmitting material is partially coated in band form with a totally reflective film, while another parallel surface of said light-transmitting material is partially coated in band form with a reflective film which has a reflectivity of 50%, and (b) said surface which is coated with said totally reflective film is inclined two-dimensionally by a prescribed amount with respect to the optical axes of the split light beams split by said first optical beam splitter;

wherein a series of split light beams with approximately 50% of the intensity of the incident light beams are split and emitted parallel to each other in a row from said semi-reflective film, and a series of split light beams with the remaining 50% of the intensity of the incident light beams are internally reflected by said semi-reflective film and completely reflected by said totally reflective film, and are therefore again emitted parallel to each other in a row from the surface coated with said semi-reflective film, but are emitted so that they miss said semi-reflective film, and are furthermore emitted so that said split light beams are separated by a prescribed distance from said series of split light beams, and so that the individual split light beams in the series are shifted by approximately one-half pitch with respect to the individual split light beams in the series, and furthermore two multi-channel ultrasonic modulators equipped with acoustic electrodes which are positioned perpendicular to the respective light beams and which independently modulate said light beams are installed adjacent to each other with said acoustic electrodes on the outside, said series of light beams with 50% intensity emitted from said semi-reflective film with a reflectivity of 50% are passed through one of said ultrasonic modulators, said series of light beams with 50% intensity emitted from said uncoated area are passed through the other multi-channel ultrasonic modulator, these light beams are individually and independently modulated on the basis of image signals, and the light beams in one series are modulated with a delay applied.

* * * * *